United States Patent [19]

Davenport

[11] Patent Number: 4,961,590
[45] Date of Patent: Oct. 9, 1990

[54] TRAILER HITCHING APPARATUS

[76] Inventor: Duke Davenport, 703 N. Birch, Owasso, Okla. 74055

[21] Appl. No.: 310,266

[22] Filed: Jul. 14, 1989

[51] Int. Cl.[5] ............................................. B60D 1/06
[52] U.S. Cl. .................................................... 280/477
[58] Field of Search ............... 280/477, 505, 507, 508, 280/511

[56] References Cited

U.S. PATENT DOCUMENTS

| | | | |
|---|---|---|---|
| 3,811,706 | 5/1974 | Tucker et al. | 280/477 X |
| 3,831,982 | 8/1974 | Bernhardt et al. | 280/511 |
| 4,416,466 | 11/1983 | Park | 280/477 |
| 4,657,275 | 4/1987 | Carroll | 280/477 |
| 4,666,177 | 5/1987 | Vinchattle | 280/477 X |
| 4,708,359 | 12/1987 | Davenport | 280/477 |

*Primary Examiner*—Charles A. Marmor
*Assistant Examiner*—Alan M. Kagen
*Attorney, Agent, or Firm*—Henderson & Sturm

[57] ABSTRACT

A trailer aligning and hitching apparatus (10) for towing vehicles (100) and a trailer having a tongue (14) wherein the apparatus (10) includes: a ball equipped hitch unit (11) associated with the trailer tongue (14); and, a base unit (12) associated with the rear of a towing vehicle (100); wherein the base unit (12) includes a base housing member (17) having an enlarged housing cavity (22) that extends through the face (21) and the top (20) of the housing member (17) whereby a ball element (15) will enter the housing member (17) through the face opening a shaft element (16) attached to the ball element (15) will pass through both the face and the top openings in the housing member (17) such that the ball element (15) will be held captive in the housing member (17) when a slidable lock bar member (31) is inserted through the housing member (17).

10 Claims, 2 Drawing Sheets

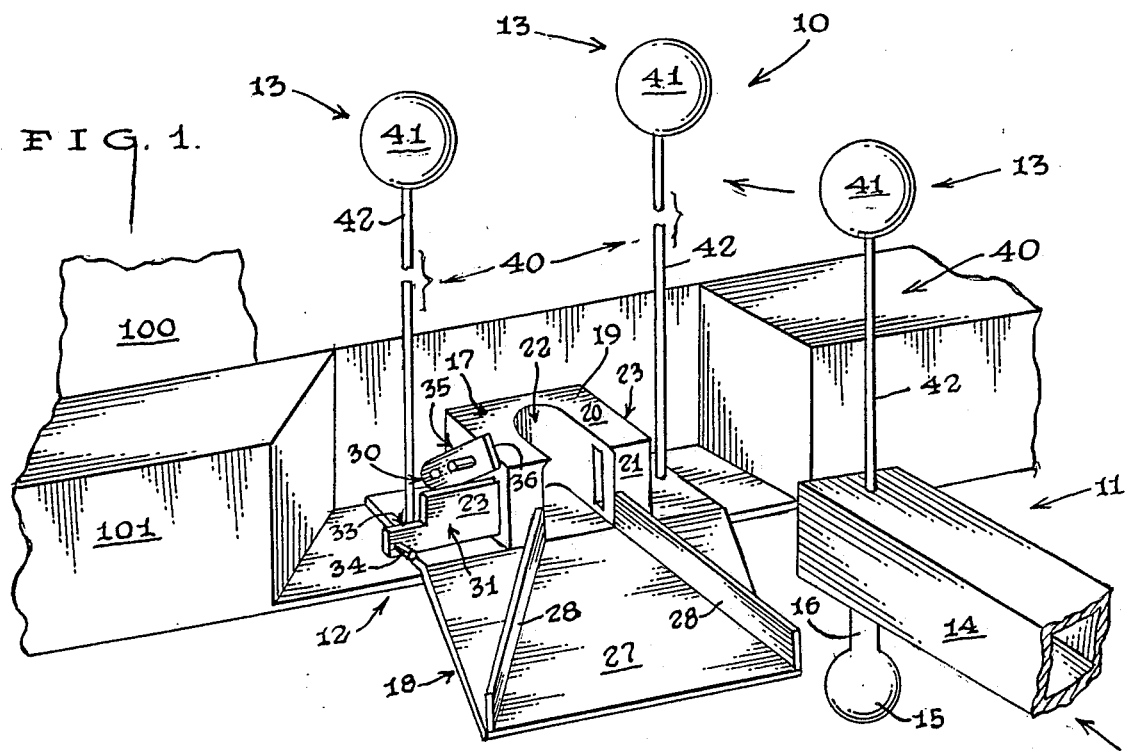
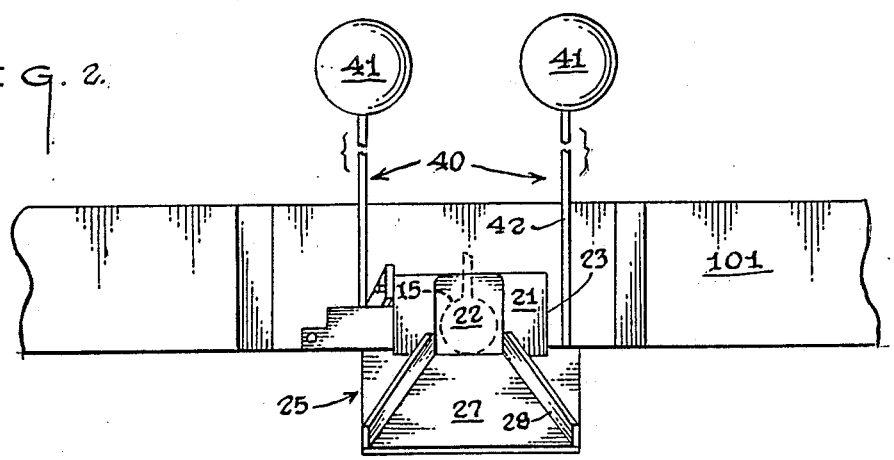
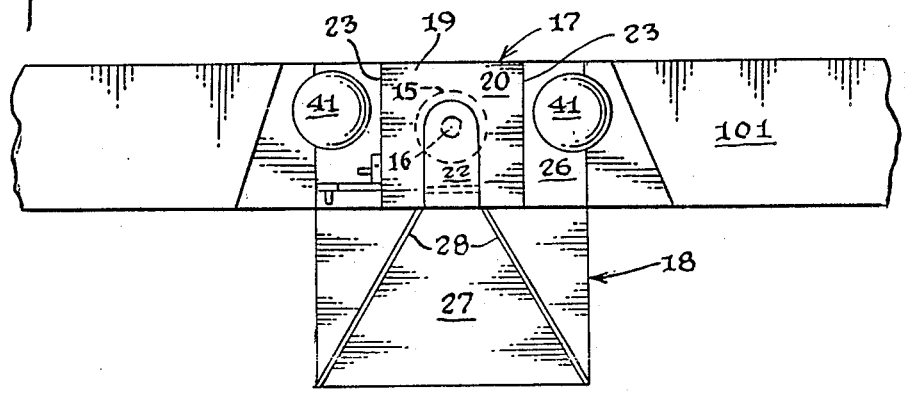

TRAILER HITCHING APPARATUS

TECHNICAL FIELD

The present invention relates generally to trailer hitches, and in particular, to a trailer hitching apparatus which permits a vehicle to be backed up so as to align and engage the hitch mechanism of the vehicle with the hitch mechanism of a trailer without requiring that a second person be available to help guide the driver of the vehicle.

BACKGROUND OF THE INVENTION

As can be seen by reference to the following U.S. Pat. No's: 4,708,359; 4,416,466; 4,657,275; 3,811,706 and 4,666,177 the prior art is replete with myriad and diverse automatic trailer hitching devices which are designed to simplify the task of aligning and engaging a ball hitch with a trailer tongue.

While all of the aforementioned prior art constructions are more than adequate from the standpoint of performing the basic function for which they have been specifically developed, these prior art devices are also uniformly deficient in at least one particular aspect of their design.

Needless to say, not all of the deficiencies revolve around a single uniform aspect of the different designs. In fact, many of the prior art constructions have very unique and well thought out cooperating structural arrangements. However, to date no one has incorporated all of the desirable features of the aforementioned diverse hitching devices into a perfectly wedded symbiotic relationship.

Briefly stated, the ideal hitching apparatus should comprise a reliable sighting and alignment arrangement between the ball hitch and the trailer tongue; a relatively automatic engagement arrangement between the hitch and the tongue once these components are aligned within acceptable limits; and, a secure locking arrangement between the tongue and the hitch once these components are operatively engaged with one another.

Therefore the primary objective of this particular invention is to come as close as possible to the ideal hitching apparatus as defined by the parameters listed above.

BRIEF SUMMARY OF THE INVENTION

The apparatus that forms the basis of the present invention involves a trailer hitching apparatus having an original and improved hitching mechanism which includes a series of sighting rods having elevated and enlarged spherical reference elements disposed on their upper ends to assist a driver in aligning and engaging the improved hitch apparatus.

The hitching mechanism comprises a base hitch unit attached to the rear of a towing vehicle and a downwardly depending ball equipped hitch unit disposed on the tongue of a trailer. The ball equipped hitch unit comprises a spherical ball element disposed at the lower end of a short shaft element; wherein, the upper end of the shaft element is attached to the tongue member of the trailer.

The base hitch unit includes a housing member having an enlarged cavity dimensioned to accept the ball element of the ball equipped hitch unit. This cavity is formed in both the top and the face of the housing member, whereby, the ball member is dimensioned to be received through the face opening and the shaft element protrudes through the top opening.

In general, the upper opening is narrower than the central core width so that the shaft of the ball equipped hitch unit may be accommodated, but the spherical ball may not pass thru the opening in the top of the housing member. In this way, the ball equipped hitch unit is vertically secured within the cavity.

The base hitch unit further includes a sliding lock bar member and a lock bar retaining member; wherein, the sliding lock bar member is disposed in a cooperating passage in the hitch unit. The lock bar member slides along its passage into a position which blocks the front opening of the cavity, thus horizontally securing the ball equipped hitch unit of the trailer. In addition, the lock bar retaining member rotates into position and serves to block the accidental removal of the lock bar member.

Furthermore, the base hitch unit includes a ramped loading unit which consists of a downwardly angled ramp member having a pair of guide walls; wherein, the ball equipped hitch unit enters at the low end of the ramp and is guided into the cavity member by the guide walls as it advances up the ramp.

The trailer hitching apparatus of the present invention further includes a pair of vehicle sighting rods having enlarged spherical reference elements wherein each of the sighting rods, attached to each side of the main hitch unit of the vehicle, which extend upward so that they are clearly visible to a person when backing up the vehicle. A similar trailer sighting rod is attached to the tongue of a trailer and extends directly above the trailer ball engaged hitch unit. In general, the trailer sighting rod and the vehicle rods are designed to be approximately the same height when in use.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein:

FIG. 1 is a perspective view of the trailer hitching apparatus;

FIG. 2 is a front plan view of the apparatus;

FIG. 3 is a top plan view;

BEST MODE FOR CARRYING OUT THE INVENTION

Figure 4:
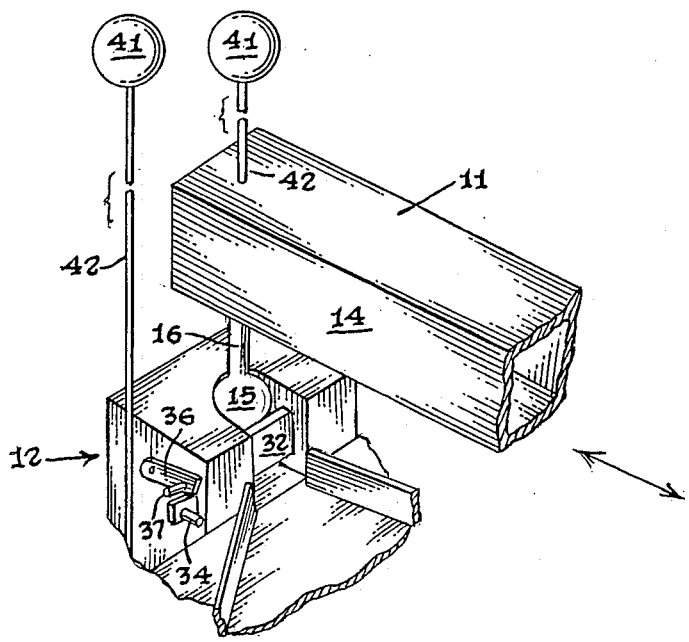
FIG. 4 is a perspective view of the apparatus with the ball equipped hitch unit in place; and, FIG. 5 is a side view of the apparatus with the ball equipped hitch unit in place.

As can be seen by reference to the drawings and in particular to FIG. 1, the trailer aligning and hitching apparatus that forms the basis of the present invention is designated generally by the reference numeral (10). The trailer hitching apparatus (10) comprises in general: a ball equipped hitch unit (11); a base unit (12); and, an elevated visual reference unit (13). These units will now be described in seriatim fashion.

As can best be seen by reference to FIGS. 1 and 4, the ball equipped hitch unit (11) comprises a conventional elongated trailer tongue member (14) which is equipped with a downwardly depending ball element (15) which is operatively attached to the tongue member (14) via a shaft element (16).

Turning now to FIGS. 1 thru 3, it can be seen that the base unit (12) is operatively attached to the rear bumper (101) of a towing vehicle (100); wherein, the base unit (12) comprises in general: a base housing member (17) and a base plate member (18). The base housing member (17) comprises a generally rectangular housing element (19) having a top (20) and a face (21) which surround an enlarged housing cavity (22). In addition, the sides (23) of the housing member (17) are provided with aligned elongated apertures (24) which extend through the housing element (19) proximate the front of the housing cavity (22).

The base plate member (18) comprises an enlarged generally rectangular rigid plate element (25) having a mounting portion (26) and a downwardly angled ramp portion (27). In addition, the ramp portion (27) is provided with a pair of guide rails (28) which extend from the outboard corners of the ramp portion (27) and which converge towards the mouth of the cavity (22) in the face (21) of the base housing member (17).

In addition, the base housing member is rigidly secured to the base plate member (18) and the mounting portion (26) of the base plate member (18) is rigidly secured to the bumper (101) of a towing vehicle (100) by conventional securing means (not shown) such as welding, super adhesives, threaded bolts, or the like.

Still referring to FIGS. 1 thru 3, it can be seen that the base plate member (18) extends substantially beyond the sides (23) of the base housing member (17) and the width of the cavity opening (22) is substantially greater in the face (21) of the base housing member (17) than it is in the top (22) of the base housing member (17). The reasons for these relative dimensions will be explained in detail further on in the specification.

Figure 5:
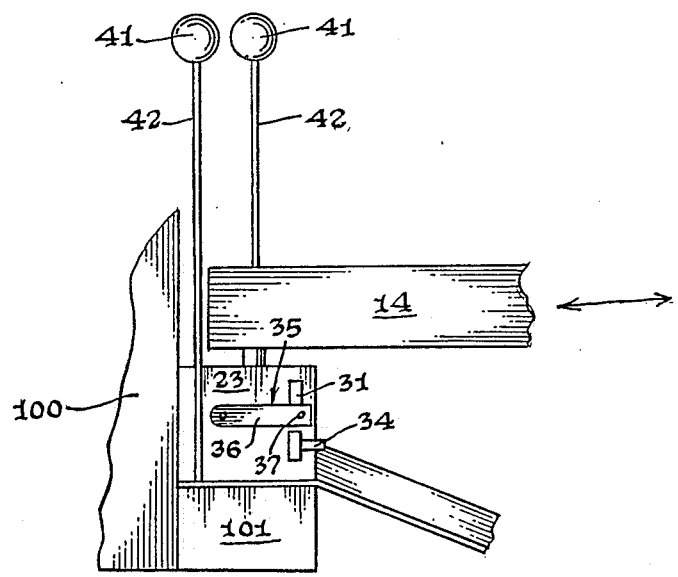

As it can best be seen by reference to FIGS. 1, 4, and 5, the base unit (12) is further provided with a pair of locking members (30) wherein the first locking member comprises a slidable lock bar member (31) which is dimensioned to be received in the aligned apertures (24) in the base housing member (17). The slidable lock bar member (31) comprises a rigid bar element (32) which as a notch (33) and a stop limit projection (34) formed on one end.

In addition, the second locking member comprises a pivoted retaining bar member (35) which includes a bar element (36) which is pivotally secured to one of the sides (23) of the base housing member (17). Furthermore, the bar element (36) is provided with a handle element (37); and, is adapted to be received in the notch (33) of the slidable lock bar member (31), when the lock bar member (31) is fully inserted into the base housing member (17) as depicted in FIGS. 4 and 5.

As can best be seen by reference to FIGS. 1 thru 3, the elevated visual reference unit (13) comprises a plurality of visual indicator members (40) including a pair of visual indicator members (40) associated with the base unit (12) and a single visual indicator member (40) associated with the trailer tongue (14).

Each of the visual indicator members (40) comprise an enlarged spherical reference element (41) mounted on an elongated rigid stem element (42). In addition, the stem elements (42) that are associated with the base unit (12) are substantially longer than the single stem element (42') associated with the ball equipped hitch unit (11); and, the spherical reference element (41) on the ball equipped hitch unit (11) is preferably a different color than the like colored spherical reference elements (41) that are associated with the base unit (11) for reasons that will be explained shortly.

Still referring to FIGS. 1 thru 3, it can be seen that the pair of visual indicator members (40) that are associated with the base unit (12) are disposed proximate the outer edges of the mounting portion (26) of the plate element (25); whereby, the indicator members (40) will be closely aligned with the outboard ends of the guide rails (28) on the ramp portion (27) of the plate element (25).

In addition, as shown in FIGS. 1, 4, and 5, the stem element (42) of the single visual indicator member (40) on the trailer tongue (14) is disposed in vertical alignment with the shaft element (16) that is attached to the ball element (15) of the hitch unit (11).

The operative engagement and cooperation between the ball equipped hitch unit (11); the base unit (12); and, the elevated visual reference unit (13) is depicted in FIGS. 1 thru 3. As shown in FIG. 1, the ball equipped hitch unit (11) is aligned with the base unit (12) by the driver backing up the towing vehicle (100) such that the single visual indicator member (40) on the trailer tongue (14) is positioned between the pair of visual indicator members (40) on the base unit. Once this alignment is achieved the driver will move the towing vehicle (100) towards the trailer tongue to bring the ball element (15) into engagement with the ramp portion (27) of the base plate member (18) intermediate the guide rails (28).

Further relative movement of the vehicle (100) towards the trailer tongue (14) will force the ball element (15) up the ramp portion and through the face (21) of the base housing member (17) into the enlarged cavity (22). As the ball element (15) is entering the cavity (22) the shaft element is passing through the narrower cavity opening in the top (20) of the base housing member (17); wherein the reduced opening in the top (20) of the base housing member (17) will prevent the vertical passage of the ball element (15) through the top of the base unit (12).

At this juncture the driver of the vehicle (100) would manually slide the rigid bar element (32) of the lock bar member (31) through the apertures (24) of the base housing member (17) to captively engage the ball element (15) within the base housing member (17); whereupon, the pivoted retaining bar member (35) would fall into the notch of the slidable lock bar member (31) to prevent the lateral displacement of the lock bar member (31) relative to the base housing member (17).

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A trailer aligning and hitching apparatus for towing vehicles and trailers having a tongue wherein the hitching apparatus comprises:
    a base unit operatively secured to the rear of the towing vehicle wherein the base unit comprises a base housing member including a generally rectangular housing element having a top a face and opposed sides; and, the housing element is further provided with an enlarged housing cavity which extends through the face and the opt of the housing element wherein the width of the cavity opening in the face of the housing element is substantially greater than the width of the cavity opening in the top of the housing element; wherein, the base housing member further comprises a pair of aligned elongated apertures formed through the sides of the housing element proximate the front of the enlarged housing cavity; and, wherein the base unit also includes a first locking member comprising a slidable lock bar member which is dimensioned to be received in said aligned apertures in the housing element and a second locking member comprising a pivoted retaining bar member which is pivotally secured about a lateral axis to one side of the housing element and adapted to operatively and releasably engage said first locking member;

a ball equipped hitch unit operatively secured to said trailer tongue wherein the hitch unit comprises a ball element operatively secured to said trailer tongue via a shaft element; wherein, said ball element is dimensioned to be received into the housing cavity of said base unit through the cavity opening in the face of said housing element; and, the shaft element is dimensioned to be received in the cavity opening in the base unit through the cavity opening in both the face and the top of said housing element; and, a visual reference unit comprising a plurality of visual indicator members operatively associated with both base unit and the base equipped hitch unit for aligning the towing vehicle with respect to the trailer tongue.

2. The trailer aligning and hitching apparatus as in claim 1 wherein said slidable lock bar member comprises a rigid bar element having a notch and a stop limit projection formed on one end.

3. The trailer aligning and hitching apparatus as in claim 2; wherein the retaining bar member is dimensioned to be received in the notch in said slidable lock bar member.

4. The trailer aligning and hitching apparatus as in claim 3 wherein the base unit further comprises:
a base plate member disposed intermediate the base housing member and the rear bumper of the towing vehicle.

5. The trailer aligning and hitching apparatus as in claim 4 wherein the base plate member comprises:
an enlarged generally rectangular rigid plate element having a mounting portion and a downwardly angled ramp portion.

6. The trailer aligning and hitching apparatus as in claim 5 wherein the base plate member is further provided with a pair of guide rails which extend from the outboard corners of the ramp portion of the plate element; and, which converge towards the mouth of the cavity in the face of the base housing element.

7. The trailer aligning and hitching apparatus as in claim 6 wherein each of said plurality of visual indicator members comprise:
an enlarged spherical reference element mounted on an elongated stem element.

8. The trailer aligning and hitching apparatus as in claim 7 wherein said plurality of visual indicator members comprise:
a pair of visual indicator members associated with said base unit; and,
another visual indicator member associated with said hitch unit.

9. The trailer aligning and hitching apparatus as in claim 8 wherein said pair of visual indicator members are disposed proximate the outer edges of the mounting portion of the plate element; whereby, the pair of indicator members will be closely aligned with the outboard ends of said guide rails.

10. The trailer aligning and hitching apparatus as in claim 9 wherein said another visual indicator member is aligned with the shaft element that is attached to the ball element in said trailer tongue.

* * * * *